United States Patent [19]

Kübler

[11] Patent Number: 4,905,518

[45] Date of Patent: Mar. 6, 1990

[54] ACCELEROMETER MOUNTING ASSEMBLY

[75] Inventor: John Kübler, E. Amherst, N.Y.

[73] Assignee: Kistler Instrumente AG, Winterthur, Switzerland

[21] Appl. No.: 288,447

[22] Filed: Dec. 22, 1988

[30] Foreign Application Priority Data

Dec. 22, 1987 [EP] European Pat. Off. ........ 87119032.8

[51] Int. Cl.4 ..................... G01P 15/08; G01H 11/06
[52] U.S. Cl. ......................................... 73/654; 73/493
[58] Field of Search ................. 73/493, 516 R, 517 R, 73/652, 654, 661, 866.5, 35

[56] References Cited

U.S. PATENT DOCUMENTS

| | | | |
|---|---|---|---|
| 3,709,042 | 1/1973 | Lee et al. | 73/516 R |
| 4,347,743 | 9/1982 | Rausche et al. | 73/493 |
| 4,771,637 | 9/1988 | Kübler | 73/493 |
| 4,797,121 | 1/1989 | Hayward | 439/579 |

Primary Examiner—John Chapman
Attorney, Agent, or Firm—Barnes & Thornburg

[57] ABSTRACT

An accelerometer, consisting of a body having a threaded coaxial nipple for screwably securing the body to a mounting base having a connection for a signal transmission cable. The mounting base can be glued firmly or screwed to a measuring surface, and configured so that accelerometers may be mounted thereto and oriented in several axial directions. It is therefore possible to investigate several axis directions successively using one accelerometer. The object to be measured out can be provided with a large number of single- or multi-axis mounting bases, enabling the entire surface of an object to be measured stepwise in one or more axes, using one or only a few accelerometers. Furthermore the detachable connection between mounting base and accelerometer body facilitates occasional calibration of the accelerometer away from the particular measuring object.

10 Claims, 2 Drawing Sheets

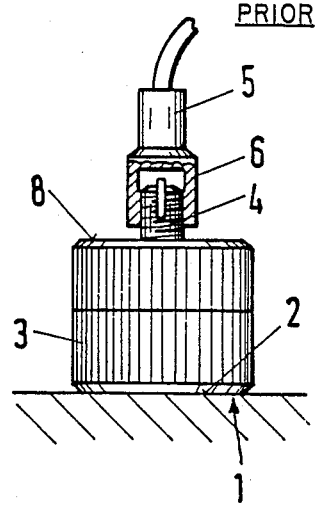
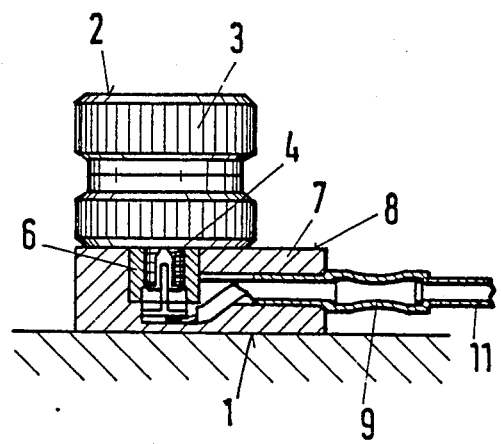
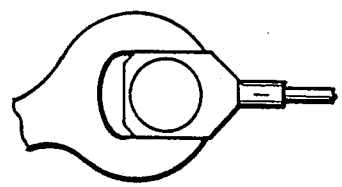
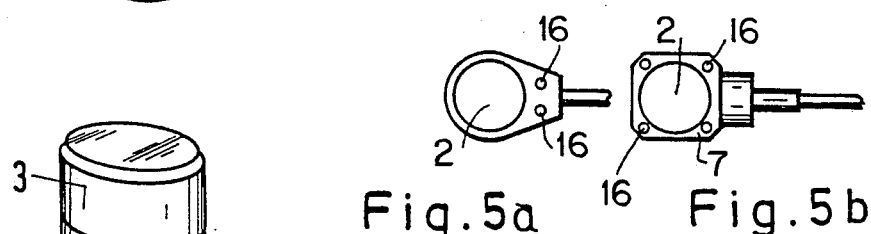
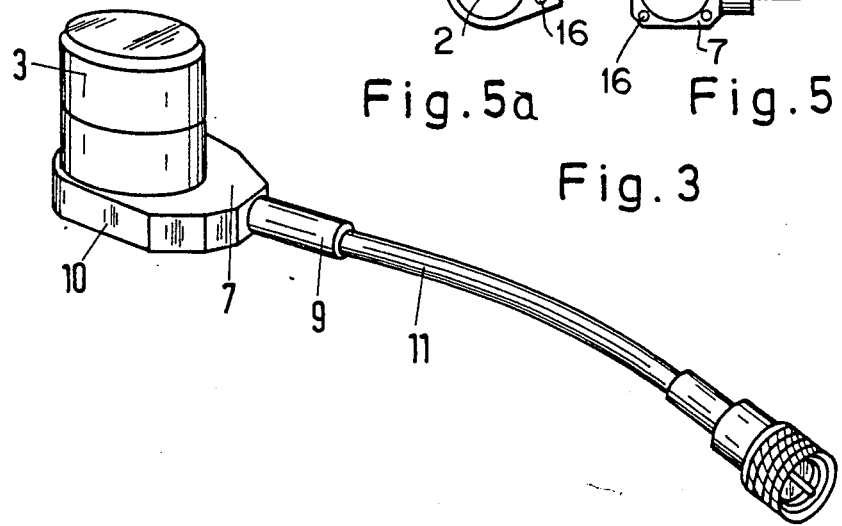

ACCELEROMETER MOUNTING ASSEMBLY

BACKGROUND AND SUMMARY OF INVENTION

The invention relates generally to an accelerometer consisting of a body provided with a coaxial plug connecting nipple, and in particular to a mounting arrangement for fixing an accelerometer detachably on the surface of an object to be measured. The invention relates also to a procedure for accelerometric measurement of the object.

Both single-axis and multi-axis accelerometers are known. They enable acceleration to be measured at a particular point on the surface of an object in one or more axial directions, and are mostly joined rigidly to the object being measured. If a surface zone on an object is to be measured accelerometrically, first an array of different measuring points is laid out. At each measuring point in the array a single- or multi-axis accelerometer is fixed. This involves a large amount of work and costs. Also transferring an accelerometer to a new measuring point array or a different surface zone was difficult, because the known accelerometers could be removed from the particular measuring surface only with difficulty. Moreover an accelerometer needs calibrating from time to time. Here again, the previous mounting of accelerometers on the object to be measured was unsatisfactory, because calibration had to be performed on the mounted accelerometer. It is much better if calibration can be carried out at a calibration station away from the measuring object.

The invention is therefore aimed at the creation of an accelerometer which can be mounted on and dismounted from an object to be measured in simple fashion, while permitting rational accelerometric measurement of a surface zone.

According to the invention, this objective is achieved by making the body of the accelerometer screwable into a mounting base fixable on the surface of a measuring object by the plug connecting nipple of the body. The mounting base has a connecting socket for a signal cable. The actual measuring element, i.e., the accelerometer, is therefore not joined directly and rigidly to the measuring surface but detachably, to an intermediate part in the form of a mounting base, making it easily exchangeable. Several mounting bases may be arranged on a measuring surface, though for accelerometric measuring-out it is not necessary to provide every mounting base with an accelerometer. According to a development of the invention, the mounting base may be designed to accept accelerometers in more than one axis direction. In particular it may be cubic in shape, with holes essentially at right angles to each other to receive the accelerometers. The mounting base is joined to the measuring surface by suitable means, for example by gluing or screwing, fixed or detachable. If required, the mounting base may have flats, enabling it to be sheared off from the measuring surface with a suitable wrench.

A process for taking a plurality of acceleration measurements using the above structure includes fixedly mounting a plurality of mounting bases to an object and sequentially removable attach one or more accelerometers to different measurement surfaces of the same or different mounting bases and take acceleration measurements at each location. This allows fewer accelerometers to make a plurality of measurements without adjustment of the mounting bases.

Other objects, advantages and novel features of the present invention will become apparent from the following detailed description of the invention when considered in conjunction with the accompanying drawings.

BRIEF DESCRIPTION OF THE DRAWINGS

FIG. 1 is a side partial cut-away view of a single-axis accelerometer according to the prior art;

FIG. 2 is a side partial cut-away view of a single-axis accelerometer with a mounting base glued onto the measuring surface according to the principles of the present invention.

FIG. 3 is a perspective view of a single-axis accelerometer with a mounting base having wrench flats.

FIG. 4 is a plane view illustrating detaching an accelerometer base using a wrench.

FIGS. 5a and 5b are plan views of mounting bases that can be screwed onto the measuring surface.

DETAILED DESCRIPTION OF THE DRAWINGS

Figure 6:
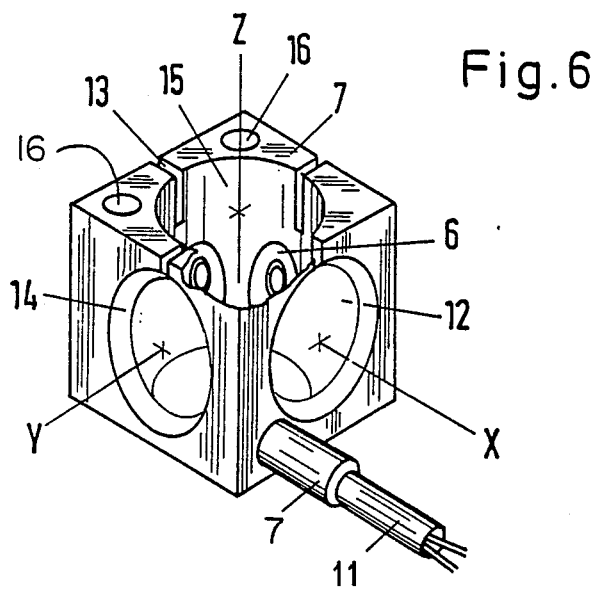
FIG. 6 is a partial cut-away perspective view of a cubic mounting base for a three-axis accelerometer.

FIG. 1 shows a conventional accelerometer as is employed typically for measuring vibration. The accelerometer has opposed mounting surfaces 2 and 8, and is joined rigidly in familiar fashion to a measuring surface 1 by glue or similar means. The accelerometer may have a cylindrical fluted body 3, and be provided with a connecting nipple 4 receiving the threaded socket 6 of the plug 5 of a cable for transmitting the measuring signals. The design of the socket connection allows commercial cables and plugs to be connected to the accelerometer.

FIGS. 2 and 3 show an accelerometer with body 3 according to FIG. 1. In accordance with the invention, however, it has a threaded socket 6 fitted in a mounting plate or base 7. The connecting nipple 4 is joined to threaded socket 6 in similar manner as mentioned above for FIG. 1. The mounting base 7 may be joined rigidly to the measuring surface 1 in suitable fashion, e.g. by gluing or screws, and it may have a connecting socket 9 for a signal transmission cable 11. Together with the connecting nipple 4, the socket 6 provides an easily detachable connection between the accelerometer and the mounting base 7. Measuring and evaluation electronics can be integrated in the accelerometer at least partially, preventing the intrusion of electrical interfering signals.

As shown in FIGS. 3 and 4, wrench flats 10 may be provided on the mounting base 7, so that the mounting base 7 may be removed from the measuring surface 1 if wanted by breaking the glued bond using a suitable wrench.

On the measuring surface 1, several mounting plates or bases 7 may be glued to accommodate accelerometers in a certain arrangement, enabling acceleration measurements to be made at different measuring points and/or in different directions. Here, as already mentioned, the mounting bases may be removed quite easily from the measuring surface, and then glued or joined rigidly to it again in a new arrangement or position.

Removing the accelerometers, typically for calibration purposes, is also easy.

FIG. 5a shows, instead of a glued bond, a screw connection between the mounting base 7 and the measuring surface 1. For this purpose the mounting base may have holes 16, through which fixing screws (not shown) may be led. The screw connection allows particularly easy separation of the mounting base from the measuring surface. FIG. 5b shows a modified embodiment of the arrangement in FIG. 5a, with four holes 16 provided in the mounting base 7 to take the fixing screws. The mounting base 7 may be designed variously according to the application, provided that mounting and dismounting of the accelerometer are assured in the simple manner desired.

FIG. 6 shows, in perspective, a cubic mounting base 7 for receiving accelerometers in three axis directions X, Y, Z at right angles to each other. In FIG. 6, identical or similar parts bear the same references as in FIG. 2. Three holes for taking the accelerometers (not shown) are designated 12, 14 and 15. Fitting is facilitated by the cylindrical form of the accelerometer body shown in FIGS. 1 and 2. Here the fluted surface of the body 3 assists fixing the accelerometers in the mounting holes 12. In the mounting base 7 are preloaded slots 13, ensuring a sure hold of the accelerometers in the mounting holes 12, 14 and 15. Holes 16 in the mounting base 7 serve to take fixing screws (not shown), in order to fix the mounting base 7 on the measuring surface 1. Also shown in FIG. 6 is the inner layout of the three-axis variant of the mounting base 7, and in particular the built in socket 6 for screw engagement with the plug connecting nipples 4 of the accelerometers. In accordance with FIG. 3, the signals generated in the individual accelerometers, when measuring, can be led outside through a single cable with plug 5 and connecting socket 9.

Figure 7:
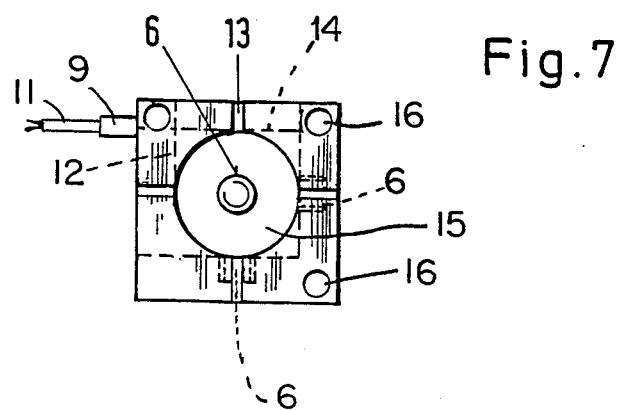
FIG. 7 is a plan view of the cubic mounting base shown in FIG. 6.

The three-axis embodiment of the mounting base illustrated in FIG. 6 also ensures that the accelerometers can easily be fitted into the mounting base and removed from it. Here too, this is accomplished by an easily releasable electromechanical connection in the form of a screw plug. In this way an accelerometer can be easily introduced in an axis direction X, Y or Z into the mounting base 7, and the acceleration measured in this direction. Subsequently, the accelerometer may be removed again and inserted in another axis direction, followed by measurement of the acceleration in this new direction. The mounting base 7 may be dimensioned to accommodate only one accelerometer, enabling it to be kept small. Again the mounting base 7 may be glued or screwed onto the measuring surface not shown. FIG. 7 shows a top or plan view of cubic mounting base illustrated in FIG. 6, with the socket 6 for receiving the plus nipple 4 of the accelerometer clearly visible. Also visible are the cable 11 and slot 13, which allow a fixed mounting of the accelerometer in the holes 12, 14 and 15 on account of the preload of the edge parts of the mounting base.

The accelerometer according to the invention is distinguished by having an intermediate part (mounting base) joined to the measuring surface, while the actual measuring part (accelerometer) fitted in simple fashion to the intermediate part is detachable therefrom. It is thus possible to provide predetermined measuring points on a surface zone to be measured accelerometrically with single- or multi-axis mounting bases optionally (by gluing or screws). Now when measuring this surface zone accelerometrically, it is not necessary to provide every mounting base with an accelerometer. Depending on the object of measurement and the method, the number of accelerometers needed may be much smaller than the number of measuring points. In the extreme case, it might be possible to perform the measurement with a single accelerometer. In a three-axis mounting base for example, by inserting an accelerometer in the hole for the X direction, this acceleration may be determined first. Then the accelerometer can be taken out of the mounting base and reinserted in the hole for the Y direction, whereupon the acceleration (for vibration the acceleration amplitude) is measured in the Y direction, and so on. This stepwise procedure for accelerometric measuring on a surface is very rational, because it is possible to work with a reduced number of accelerometers.

If a new arrangement of measuring points is desired, the mounting plates glued or screwed to the measuring surface are easily detached, using a wrench typically, and easily attached again at new measuring points.

As already mentioned at the beginning, the simple mounting and dismounting of an accelerometer or its measuring part also facilitates calibration.

Although the present invention has been described and illustrated in detail, it is to be clearly understood that the same is by way of illustration and example only, and is not to be taken by way of limitation. The spirit and scope of the present invention are to be limited only by the terms of the appended claims.

I claim:

1. An accelerometer comprising:
   body having a threaded coaxial electrical nipple;
   acceleration sensor in said body;
   mounting base means having a thread electrical socket for receiving said electrical nipple to secure said body to a surface of said mounting base means; and
   connecting socket in said mounting base means for connecting said electrical socket to a signal transmission cable.

2. An accelerometer according to claim 1 wherein said mounting base means includes a plurality of electrical sockets at a plurality of surfaces to mount a body in more than one axial directions.

3. An accelerometer according to claim 2, wherein said mounting base means has a cubic shape and said electrical sockets are at right angles to each other.

4. An accelerometer according to claim 1 including mounting means for mounting said mounting base means to an object at a mounting surface.

5. An accelerometer according to claim 4 including flutes on said mounting base means for receiving wrench.

6. An accelerometer according to claim 4 wherein said mounting means includes holes in said mounting base means and screws in said holes.

7. An accelerometer according to claim 4 wherein said mounting means is glue.

8. An accelerometer according to claim 1 wherein said body has a cylindrical shape and said mounting base means has at least one mounting hole for receiving said cylindrical shape of said body.

9. An accelerometer according to claim 8 wherein said mounting hole includes a preloaded slot.

10. An accelerometer according to claim 8 wherein said mounting base means includes a plurality of electrical sockets in a plurality of mounting holes in a plurality of surfaces.

* * * * *